Figure 1:
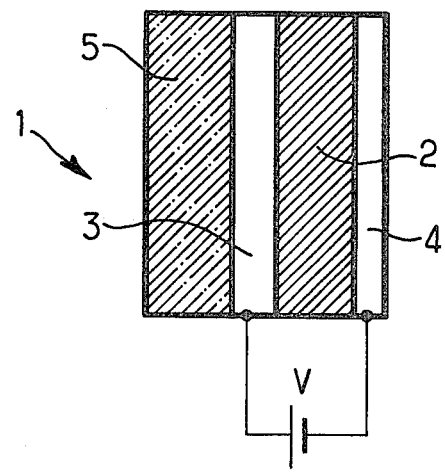

United States Patent [19]

Malugani et al.

[11] 4,211,475
[45] Jul. 8, 1980

[54] ELECTRO-OPTIC DISPLAY DEVICE USING A VITREOUS SOLID ION-CONDUCTIVE MATERIAL

[75] Inventors: Jean-Pierre Malugani; Alain Wasniewski; Michel Doreau; Guy Robert; Odile Hubert; Michel Massin, all of Besancon, France

[73] Assignee: Centre Technique de l'Industrie Horiogere "Ceterhor" Laboratoire d'Electrochimie-Faculte des Sciences et des Techniques, Besançon, France

[21] Appl. No.: 918,103

[22] Filed: Jun. 22, 1978

[30] Foreign Application Priority Data

Jun. 29, 1977 [FR] France .............................. 77 19989

[51] Int. Cl.$^2$ .......................... G02F 1/17; G02F 1/19; G02F 1/23
[52] U.S. Cl. ................................. 350/357; 252/408; 252/518; 350/363
[58] Field of Search ................ 252/518, 408; 350/357, 350/356, 363

[56] References Cited

U.S. PATENT DOCUMENTS

| | | | |
|---|---|---|---|
| 3,516,185 | 6/1970 | Paine | 350/357 |
| 3,560,078 | 2/1971 | McIntyre et al. | 350/357 |
| 3,712,710 | 1/1973 | Castellion et al. | 350/357 |
| 3,971,624 | 7/1976 | Bruesch et al. | 350/357 |
| 3,995,940 | 12/1976 | Guyon et al. | 350/363 |
| 3,995,943 | 12/1976 | Jasinski | 350/357 |
| 4,009,936 | 3/1977 | Kasai | 350/357 |
| 4,013,343 | 3/1977 | Jaccard et al. | 350/357 |
| 4,106,862 | 8/1978 | Bayard | 350/357 |
| 4,110,259 | 8/1978 | Jichel | 350/357 |

FOREIGN PATENT DOCUMENTS

| | | | |
|---|---|---|---|
| 2519047 | 11/1975 | Fed. Rep. of Germany | 350/357 |
| 2297472 | 8/1976 | France | 350/357 |

OTHER PUBLICATIONS

Green, M., et al., Thin Solid Films, vol. 24, pp. 545–546 (1974).

*Primary Examiner*—Teddy S. Gron

[57] ABSTRACT

The invention relates to an electro-optic device using a vitreous solid ion-conductive electrolyte which is of the general formula $xMaXb$, $yM'PO_3$ wherein M is selected from K, Na, Ag, Li, Pb; X is selected from Br, I, Cl, F, S, $SO_4$; M' is selected from Li, Ag, Na. Said device is particularly used in electro-optic information-display systems.

11 Claims, 3 Drawing Figures

ELECTRO-OPTIC DISPLAY DEVICE USING A VITREOUS SOLID ION-CONDUCTIVE MATERIAL

The present invention relates generally to electro-optic information-display devices and has more particularly for its subject-matter an electro-optic display device provided with a vitreous solid ionic conductor.

Solid ionic conductors nowadays have a great number of applications such as specific solid-membrane electrodes, gas analysers, electric cells and storage batteries. They are particularly of interest for the reason that they impart to the systems in which they are used considerable ruggedness and simple design technology, due to their physical condition.

Their use has also been recommended in electro-optic systems. Devices are known which exhibit variable optical properties, are controlled by the passage of electric current and include a vitreous solid lead-salt silica and boron-oxide based electrolyte. However, the ionic conduction of the electrolyte is low and requires, for satisfactory operation at ordinary or normal temperaure, either high voltage or a long time.

Also known are solid-electrolyte electro-optic display devices having generally a crystalline structure. The ion-conductivity conductivity of the materials used can be very high at ordinary temperature and comparable with that of the best electrolytes in solution. This results in the possibility of operation at low voltages, of the order of 1 volt, and with very short response time. However, the presence of grain joints in such solid electrolytes may entail, during the charging discharging cycles, the formation of metallic dendrites which short-circuit the electrodes and lead to destruction of the device due to the occurrence of electronic conduction.

The purpose of the invention is to design electro-optic information-display devices of large or small volume using glasses as electrolyte. Such glasses display high ion conduction at normal temperature and negligible electronic conduction. They thus allow the above shortcomings to be obviated while at the same time maintaining operating d.c. voltages lower than 1 volt and short response times.

To this end, the invention provides an entirely solid display device, characterized in that it comprises a vitreous solid electrolyte that is conductive with respect to ions, which ions can react electrochemically under the action of an electric field to produce a compound whose absorption and/or reflection properties with respect to the electromagnetic radiations within the visible spectrum are notably different from those of the solid electrolyte used, with, on one face of the electrolyte, a transparent electrode in contact on one side with the electrolyte and on the other side with a thick transparent substrate, and on the other face of the electrolyte, a layer of metal capable of electrochemical generation of ions which can migrate in the solid electrolyte, and electric and electronic systems for applying a suitable d.c. voltage between the metal layer and the transparent electrolyte over a predetermined period of time and with variable polarity.

According to another characterizing feature of the invention, an opaque solid electrolyte layer is intercalated between the vitreous solid electrolyte and the metal.

According to another characterizing feature of the invention, the vitreous solid electrolyte is of the following general formule $$xMaXb, yM'PO_3$$

and is a good ion conductor at room or ambient temperature, wherein M is K, Na, Ag, Li, Pb; X is I, Br, Cl, F, O, S, $SO_4$; and M' is Li, Ag, Na.

The invention also provides a method of obtaining a vitreous solid electrolyte of the aforesaid formula, characterized in that it consists in performing a melting in air, in melting pots or crucibles of alumina or in an inert atmosphere, where M and/or M' is lithium, or in primary vacuum in silica tubes, where N and/or M' is sodium, at temperatures comprised between 500° and 800° C., of a mixture of x moles % of MaXb and y moles % of $M'PO_3$, in maintaining the molten mass to that temperature for about 15 to 30 minutes, and lastly in allowing the said molten mass to harden in air.

Figure 2:
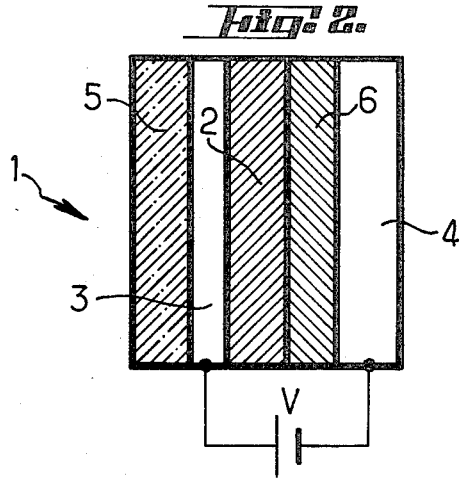
Figure 3:
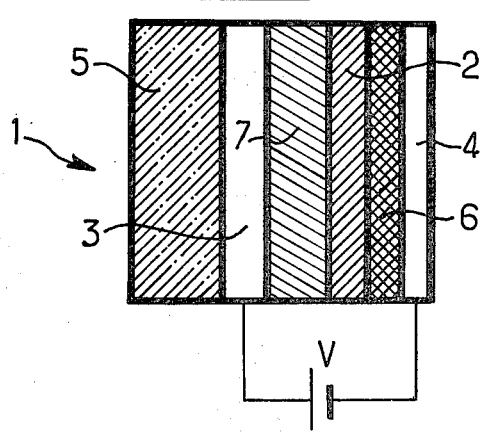

Other advantages, characterizing features and details will appear more clearly from the following explanatory description made with reference to the appended drawings given solely by way of example and wherein:

FIG. 1 is a diagrammatic sectional view of an electrolytic cell using a silver-ion conductive vitreous solid electrolyte in conformity with the invention and according to a first form of embodiment, FIG. 2 is a diagrammatic sectional view of an electrolytic cell in conformity with the invention according to a second form of embodiment, and FIG. 3 is a diagrammatic sectional view of an electrochromic cell using a silver-ion conductive, vitreous solid electrolyte.

The previously mentioned display systems are of the "passive" type, which means that they use the ambient white light as a light source and they modify the reflection and absorption coefficients of the electromagnetic radiations during their passage through the cell. This passage from a first absorption condition to a second absorption condition takes place in a controlled manner by means of a suitably adjusted field of a given direction. Reversion to the initial absorption condition is ensured by an electric field of opposite polarity.

Both systems according to the invention which will be described below are memory or storage systems, i.e. when the said electric field is suppressed the absorbing condition (whether it be transparent or colored) of the substance is maintained.

Referring to FIG. 1, the electrolytic device 1 comprises a thin vitreous electrolyte pellet 2 pertaining to the binary system $AgI$-$AgPO_3$ and composed of 55 moles % of AgI and 45 moles % of $AgPO_3$. The glass 2 is intercalated between two electrodes 3, 4 to the terminals of which is applied a desired voltage V. One of the two electrodes, e.g. the electrode 3, is transparent and constituted by a layer of antimony-doped tin oxide or of tin-doped indium oxide deposited on a transparent rigid support 5 such as a thin glass plate or lamella. The electrode 3 must be chemically inert or neutral in respect of the electrolyte 2 and may also be constituted by a thin transparent layer of gold deposited through vacuum vaporization on a glass plate or lamella. The second electrode 4 is formed of a solid or massive silver layer deposited through vacuum vaporization and constituting the source of silver ions.

In FIG. 2 is illustrated an alternative form of embodiment of the electrolytic cell represented in FIG. 1.

Since the solid electrolyte 2 of the cell of FIG. 1 is transparent, the massive silver layer 4 constituting the second electrode will be perceived by transmission through the solid electrolyte 2. The system will therefore have a greyish aspect.

In order to avoid the drawback, there is intercalated, in the electrolytic cell represented in FIG. 2, between the electrolyte 2 and the second electrode 4, a second solid electrolyte layer 6, which is an opaque silver-ion conductive layer. The electrolyte 6 is selected from either the binary system $PbI_2$-$AgPO_3$, composed of 19.5 moles % of $PbI_2$ and 80.5 moles % of $AgPO_3$, or the binary systems MI-AgPO, wherein M is Na or K.

The electrolytic cells shown in FIGS. 1 and 2 have a sandwich-type structure. The solid electrolyte 2 is applied to the transparent electrode 3 by hot-pressing under vacuum in order to use the "plastic" properties of this material or efficient "sticking". Another method consists in atomizing the solid electrolyte 2 onto the transparent electrode 3 through cathodic atomization or; conversely, in atomizing transparent electrode 3 onto the solid electrolyte 2.

The advantage of the cells using such a vitreous solid electrolyte is that they are controlled under voltages of the order of 0.5 volt at room or ambient temperature and with a switching time that is suitable for example for timepiece displays. Owing to light rays being reflected by the electrolyte 2, the latter impart to the display its background or basic color.

Under the action of the applied voltage the silver ions $Ag^+$ present in the solid electrolyte 2 migrate towards the electrode 3 where they are reduced to metallic silver Ag causing a visible change in aspect of the transparent electrode 3. Simultaneously, the silver atoms of the electrode 4 are oxidized to the condition of $Ag^+$ ions and migrate within the solid electrolyte 2 to compensate for the previous loss of $Ag^+$ ions and prevent parasitic internal tensions within the electrolyte itself. This constitutes the writing process. Deletion is obtained by reverting the voltage polarity to cause the $Ag^+$ ions to migrate in the opposite direction.

In FIG. 3 is shown a display system according to the invention, referred to as an "electrochromic system", which uses the property of certain substances to take on color under the action of an electric field. Also this system pertains to the "passive memory". The substance used is characterized by the fact that it may assume two stable conditions: a first condition in which it absorbs no electromagnetic radiation of the visible spectrum, thus being imparted a transparent aspect, and a second stable condition in which it absorbs a radiation of predetermined wavelength of the visible spectrum, thus being imparted colored aspect.

The electrochemical substances used in this application are all the oxides of the transition metals capable of accepting the silver element as an insertion element to produce a "bronze" of the $Ag_xMO_m$ type where M is the transition metal.

Moreover, the electrochromic substance must possess unneglibible combined (ionic and electronic) conduction at room or ambient temperature.

The electrochromic cell 1 comprises an electrode 3 which, as in the electrolyte cell, is a transparent electrode covering a substrate 5 which also is transparent. The electrochromic layer is represented by the layer 7 placed between the electrode 3 and the solid electrolyte layer 2 which forms the electrically insulating layer containing $Ag^+$ ions, i.e. ions that promote coloration in the electrochemical substance 7. The remainder of the cell 1 is constituted as previously by a second solid electrolyte layer 6, and a second electrode 4 which is a source of $Ag^+$ ions.

The advantage of the electrochromic cell over the electrolytic cell appears clearly where non-plastic solid electrolytes are used. Indeed, in the electrochromic cell, the electrochemical reaction takes place within the electrochromic substance 7 itself, whereas in the electrolyte cell the deposition of metallic silver takes place at the interface between electrolyte and transparent electrode 3. Such a device therefore tends to create, after a certain number of charging-discharging cycles, a space between the electrode and the electrolyte, thus destroying the electric contact and considerably reducing the life of the device.

The use of the solid electrolytes according to the invention allows this deterioration phenomenon to be much less feared since the materials used possess high plasticity. This increases the life of the displays.

According to the invention, the vitreous ionic solid electrolyte is constituted by a material of the general formula:

$$xMaXb, yM'PO_3$$

wherein M is slected from K, Na, Ag, Li or Pb; X is selected from I, Br, Cl, F, O, S or $SO_4$; and M' is selected from Ag, Li, Na.

In the case of lithium, the compounds cannot be readily prepared at room temperature. In other cases they are easily obtained and exhibit high stability in respect of air oxygen and moisture.

In case M' is silver, the electrolytes are characterized by the presence of the $AgPO_3$ compounds in the form of silver polymetaphosphate.

Those compounds exhibit very good conductivity with respect to ions at ordinary temperature (25° C.), of the order of $10^{-2}$ $ohm^{-1} \cdot cm^{-1}$ and negligible electronic conductivity, i.e. less than $10^{-7} ohm^{-1} \cdot cm^{-1}$ at 50° C. Such maximum ionic conductivity is obtained with a well-defined glass composition. There are, however, a range of compositions within which the materials are still vitreous and possess sufficiently high ionic conductivity to allow them to be used in electrochemical applications. By way of example, the following table gives the ionic conductivities obtained in the binary systems $AgI$-$AgPO_3$, $PbI_2$-$AgPo_3$, $NaI$-$AgPO_3$ and $KI$-$AgPO_3$.

| COMPOSITION (MOLES %) | | ELECTRIC CONDUCTIVITY ($ohm^{-1} \cdot cm^{-1}$ at 25° C.) |
|---|---|---|
| AgI | $AgPO_3$ | |
| 57.5 | 42.5 | $10^{-2}$ |
| 50 | 50 | $5.6 \times 10^{-3}$ |
| 45 | 55 | $2 \times 10^{-3}$ |
| 40 | 60 | $10^{-3}$ |
| $PbI_2$ | $AgPO_3$ | |
| 19 | 81 | $7 \times 10^{-3}$ |
| 18 | 82 | $3 \times 10^{-3}$ |
| 16 | 84 | $10^{-3}$ |
| NaI | $AgPO_3$ | |
| 25 | 75 | $10^{-3}$ |
| KI | $AgPO_3$ | |
| 25 | 75 | $10^{-3}$ |

The AgI-AgPO$_3$ glass (55 moles % of AgI and 45 moles % of AgPO$_3$) which will be used more particularly in the applications of the present invention is obtained as follows: a mixture of 55 moles % of sliver iodide and 45 moles % polymetaphosphate is brought into fusion between 500° and 550° C. in a normal atmosphere in a melting pot or crucible of alumina, the mass thus obtained is fused and maintained at that temperature for from 15 to 30 minutes and is thereafter rapidly poured into a cylindrical metal mould maintained at room or ambient temperature.

The conductivity with respect to ions of the pellets thus obtained, on the faces of which are deposited metallic electrodes, measured at 25° C. in the ambient air, is equal to $10^{-2}$ ohm$^{-1}$. cm$^{-1}$.

All other glasses are prepared in the same manner, using an inert atmosphere in the case where M and/or M' is an Li$^+$ ion, or a tube of silica sealed under primary vacuum in case M and/or M' is an Na$^+$ ion. The melting temperatures are then comprised between 500° and 800° C.

It is important to note that the invention is not limited to silver-ion-conductive, solid electrolytes. It may also be extended to all systems comprising a solid electrolyte in vitreous condition, which is good conductor with respect to ions at ambient or room temperature, and containing ions capable of producing, by a reversible electrochemical reaction under the action of an electric field, to a compound which modifies the absorbing properties of a layer in contact with a transparent electrode. Depending on the composition of the solid electrolyte and on the doping performed during its manufacture, various colors can be obtained. This ensures a wide scope in the selection of the background or basic color of the desired display.

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. An electro-optic display device comprising: a silver ion conductive vitreous solid electrolyte; a transparent electrode in contact with one face of said solid electrolyte; a silver metal electrode in contact with another face of said solid electrolyte; a transparent substrate supporting said transparent electrode; and means for applying an electrical potential between said transparent electrode and said silver metal electrode, said solid electroylyte being a member selected from the group consisting of the binary systems:
   40 to 57.5 mol % AgI-60 to 42.5 mol % AgPO;
   16 to 19.5 mol % PbI$_2$-84 to 80.5 mol % AgPO$_3$;
   25 mol % NaI-75 mol % AgPO$_3$; and
   25 mol % KI-75 mol % AgPO$_3$,
   said solid electrolyte having an electical conductivity at 25° C. of about $10^{-2}$ to $10^{-3}$ ohm$^{-1}$cm$^{-1}$;
   said transparent electrode being a member selected from the group consisting of electronically conductive doped metallic oxides and noble metal films.

2. An electro-optic display device as claimed in claim 1, wherein said solid electrolyte contains silver polymetaphosphate.

3. An electro-optic display device as claimed in claim 1, further comprising an opaque solid electrolyte layer intercalated between said vitreous solid electrolyte and said silver metal electrode, said opaque solid electrolyte being a member selected from the group consisting of the binary systems:
   19.5 mole % PbI$_2$-80.5 mole % AgPO$_3$;
   25 mole % NaI-75 mole % AgPO$_3$; and
   25 mole % KI-75 mole % AgPO$_3$.

4. An electro-optic display device as claimed in claim 1, wherein said display device comprises an electrolytic cell, and application of said electrical potential causes reversible formation of metallic silver at the interface between said solid electrolyte and said transparent electrode.

5. A display device as claimed in claim 1, further comprising an electrochromic layer intercolated between said transparent electrode and said solid electrolyte, said electrochromic layer being a transition metal oxide capable of forming an insertion compound with silver ions.

6. A display device as claimed in claim 5, wherein said transparent electrode is tin-doped indium oxide.

7. A display device as claimed in claim 5, wherein said transparent electrode is antimony-doped tin oxide.

8. A display device as claimed in claim 5, wherein said transparent electrode is gold.

9. A display device as claimed in claim 5, wherein said transparent electrode is platinum.

10. A display device as claimed in claim 5, wherein said solid electrolyte contains silver polymetaphosphate.

11. A display device as claimed in claim 3, further comprising an electrochromic layer intercalated between said transparent electrode and said solid electrolyte, said electrochromic layer being a transition metal oxide capable of forming an insertion compound with silver ions.

* * * * *

UNITED STATES PATENT AND TRADEMARK OFFICE
CERTIFICATE OF CORRECTION

PATENT NO. : 4,211,475
DATED : July 8, 1980
INVENTOR(S) : Jean-Pierre Malugani, et al It is certified that error appears in the above-identified patent and that said Letters Patent are hereby corrected as shown below:

Page 1, the assignees should be identified as follows:

---Centre Technique de L'Industrie
 Horiogere "Cetehor", Besancon, France and

Laboratoire d'Electrochimie-Faculte des Sciences
et des Techniques, Besancon, France---.

Signed and Sealed this

Ninth Day of December 1980

[SEAL]

Attest:

SIDNEY A. DIAMOND

Attesting Officer

Commissioner of Patents and Trademarks